July 22, 1952          M. D. BERGAN          2,604,341
T TAP
Filed Dec. 24, 1946
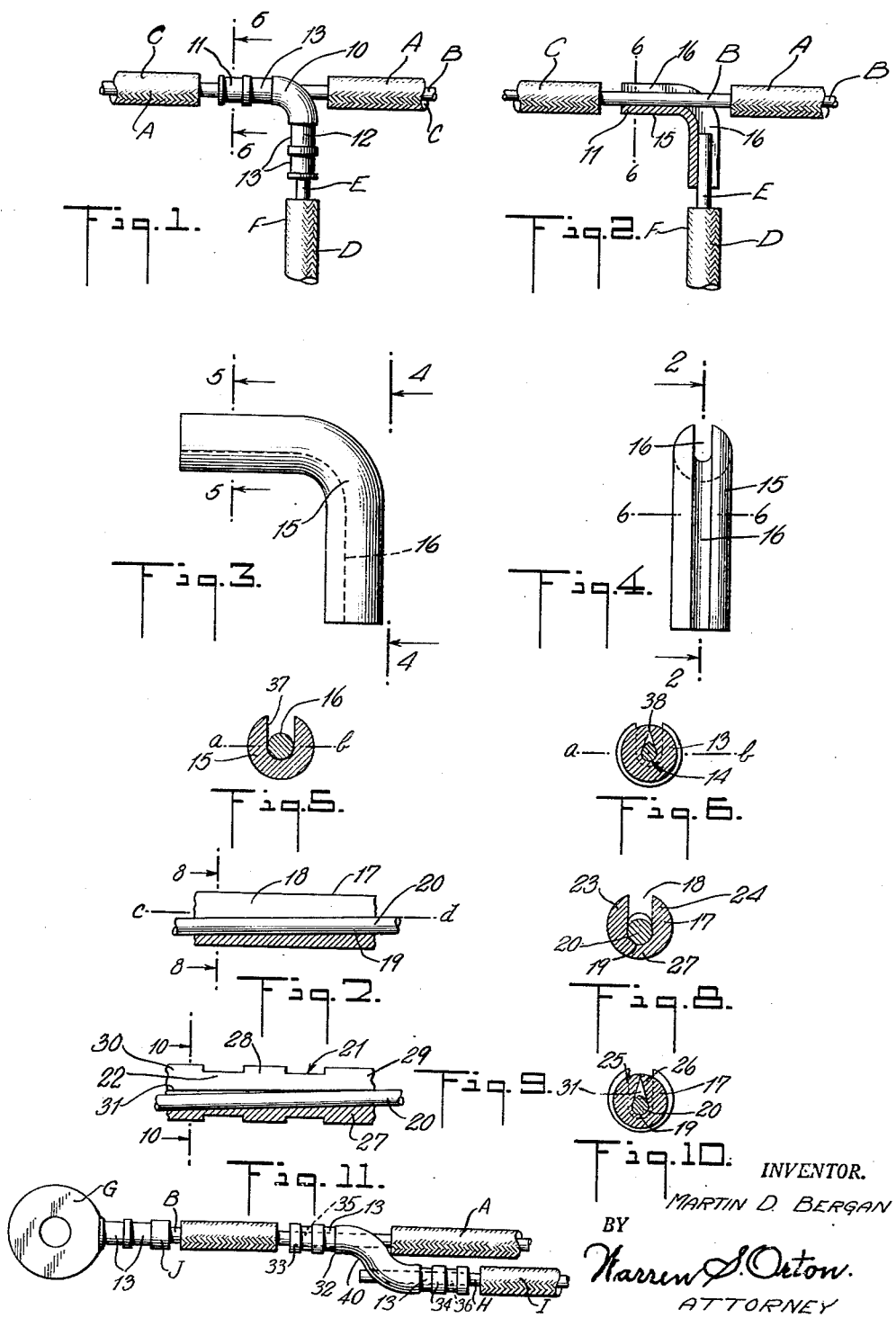
INVENTOR.
MARTIN D. BERGAN
BY
Warren S. Orton.
ATTORNEY Patented July 22, 1952

2,604,341

UNITED STATES PATENT OFFICE 2,604,341

T TAP

Martin D. Bergan, Westfield, N. J., assignor to
The Thomas & Betts Co., Elizabeth, N. J., a
corporation of New Jersey Application December 24, 1946, Serial No. 718,138

7 Claims. (Cl. 287—75)

1

The invention relates to a method for joining electric wires to provide for a temporary or permanent electric connection therebetween and specifically relates to a new technic in the art of joining a T tap to a main line by means of a connector largely preformed before being installed in place. The invention also relates to the initial stock material of which the final connector is formed and to the resulting structure which utilizes the stock material.

One embodiment of the invention herein disclosed features the use of an elbow and another a Z-shaped member both formed of conductive metal capable of having its end portion crimped or rolled into a firm binding engagement with the main line and with the tap line intruded into opposite ends of the elbow or Z member. It has been known heretofore to thread the ends of two wires into the bores of a pair of complete sleeves forming the angularly related ends of a one-piece metallic elbow, and to then roll the sleeves each for its entire length into intimate contact with the wires inserted therein and this was done usually by means of a heavy rolling machine. This known practice has several objections; among which might be mentioned that the device can be installed only in those situations where the ends of both wires are available for threading into the sleeves and thus the known devices cannot be utilized for the installation of a tap at a mid-portion of the main lead; further, the wires must fit the bores of the formed sleeves, more or less accurately, and, more seriously, the sleeves have their entire cross-section deformed to effect the necessary binding with the wire or wires intruded into the same, and which practice in turn necessitates the use of powerful power actuated rolling or crimping tools capable of crimping the sleeves.

In the use of connectors of the type herein featured, it is a practical advantage to preform the stock connectors at the factory before installation and thus should be made under carefully supervised factory condition. When so formed, the stock can be controlled not only insofar as their dimensions are concerned but also with relation to certain desirable physical characteristics, such as tensile strength and conductivity and at the same time to minimize in the amount of material necessary to be used with each different type of connector.

The present disclosure features an electric connector the major portion of which when in use is undeformed, that it, is possesses for the most part its initial factory fabricated form and physi-

2 cal characteristics and in which only a minor part is involved in any distorting operation incidental to it being installed in its final operative position.

The primary object of the invention is to provide an improved technique in connecting a tap to the main lead so that the connection may be made at any point desired along the length of the line without necessity of cutting the line, to make the installation either temporarily or permanent and to do this with simple hand operated crimping tools.

Another object of the invention is to provide a form of connector which may be of the straight, elbow type, or any other desired angular type for connecting two wires by crimping or even by a rolling or other squeezing operation, and in which only a small and easily deformed portion of the connector is distorted or deformed, leaving the major portion of the material which forms the connector in its original undeformed and factory produced condition.

Broadly this aspect of the invention is obtained by providing the connector with a preformed slot or slots into one of which or into one end of which the wire forming the main line and into the other of which the end of the tap line is inserted and in which relatively thin walls defining opposite sides of the slot or slots, are crimped or folded inwardly towards each other into a binding tight engagement with the wires. The disclosure particularly features the fact that the material forming the bottom of the slot is not deformed and that the maximum deformation is in the area of least cross section of the material.

Various other objects and advantages of the invention will be in part obvious from a consideration of the method features of the disclosure, in part from an inspection of the accompanying drawings and in part will be more fully set forth in the following particular description of one method of practicing the invention and will be more fully set forth in the following particular description of three forms of coupling devices embodying the invention.

In the accompanying drawings:

Figure 1 is a view in side elevation showing a preferred embodiment of the invention in elbow form connecting a tap wire with a main line;

Figure 2 is a sectional view taken in the medial plane of the elbow shown in Figure 1, that is on the line 2—2 of Figure 4, before the elbow has been swedged onto the wires and illustrating the relation of the parts at the first step of the method herein featured;

Figure 3 is an enlarged side view of the stock elbow as shown in Figure 2 as it comes from the factory;

Figure 4 is an end view of the stock elbow of Figure 3 as viewed from the plane indicated by the line 4—4;

Figures 5 and 6 each transverse sectional views taken respectively on the line 5—5 of Figure 1 and on the lines 6—6 of Figures 2, 3 and 4;

Figures 7 and 8 are respectively an axial and a transverse cross section of a modified form of connector before the sidewalls are crimped onto the wire located in its slot, Figures 9 and 10 are similar views of the completed connection of this modified form after the sidewalls had been crimped into binding engagement with the wire, and Figure 11 is a view of a modified form featuring the Z form of connection.

In the drawings and referring to Figures 1 and 2, there is disclosed a main lead or wire A including a conductor B enclosed in insulation C, and a tap wire D which comprises a conductor E enclosed in insulation F. It is understood that the leads, wires or cables A and D are of conventional construction and are intended to illustrate any form of conductors now in use which form taps or main electric lines.

The tap wire D is connected mechanically and electrically to the main lead A by means of a connector 10, particularly forming the subject matter of this disclosure and one form of which is of the elbow type as shown in Figure 1. The finished elbow connector 10 includes two end portions or legs 11 and 12 extending at right angles to each other and secured respectively to the conductors D and E by crimped bands 13 usually formed in situ by a hand crimping tool of the type which the operator can handle conveniently even when aloft in high places.

Referring to the stock elbow 15 before they are crimped, swedged or otherwise distorted into their final form as shown in Figures 1 and 6, reference is made first to the stock material as shown in Figures 2, 3, 4 and 5. The elbow initially is of straight cylindrical stock bent on a 1/8" radius as viewed in Figure 3. In one form now in general use the stock elbow has a 5/16" O. D. and is formed of hard copper, fully annealed after the elbow has been slotted and finally finished with an electro tin coating.

The outer side of the elbow is provided with a deep slot 16, continuous about the bend from one into the other leg and forming in each leg an open end channel. The elbow is either milled with the slot or is wire drawn to the slotted shape or U-shaped form in cross section and then bent into the elbow form. This slot has a width between its parallel faces 37 in the illustrated case about 0.128 inch and in any case is dimensioned so that the conductors B and E will have a freely sliding but snug fit therein and will be guided between the faces 37 as they move on to the seat 14 at the bottom of the slot. In this way the elbow can be held frictionally onto the main lead and tap wire before it is finally crimped into position. The bottom 14 of the slot as best shown in Figure 5 is semi-circular at any cross section with its center at the axis of the cylindrical stock of which the elbow is formed. However, where more material is desired in the portion of the elbow at the bottom of the slot, the slot cutting need not be as deep as illustrated.

In forming the Figure 1 disclosure, the portion of the insulation C where the tap is to be made is cut away conventionally to expose a necessary length of the conductor B. Likewise, a portion of the insulation F is removed from an end of the tap wire B so as to expose that end of its conductor E which is to receive current from the main line A.

The elbow is located as indicated in Figure 2 by pushing one end or leg portion 11 upwardly until the wire B rests snugly on the bottom of the slot 16. Then by means of a crimping tool, first one and then the other of the two bands 13 are formed as shown at the top of the Figure 1. In this operation the upstanding sidewalls outlining the slot 16 as best shown in Figure 5 are each bent or curled inwardly from their upstanding positions into their inwardly and downwardly curled positions shown in Figure 6 with the contacting edges of the sidewalls bearing firmly on each other to form a sealed joint 38 at the places where the crimping is made.

It is particularly noted that practically all of the distortion in the metal which forms the elbow takes place above the transverse axis $a$—$b$ and that the unslotted portion constituting the major part of the cross section of material below the plane $a$—$b$ is not distorted and in effect is in the same physical condition as when the elbow left the factory. This means that it is only the thinned out sidewalls above the plane $a$—$b$ which are deformed and the greatest deformation is had at the upper or outer extremity of these walls where the cross sections, as shown in Fig. 5, rapidly approach a sharp or feathered edge, and thus the feathered edges are easy to crimp or roll and without the necessity of involving the entire cross section of material.

Referring to the second form of the invention disposed in Figures 7-10, there is shown a length of slotted connector which may be considered either as one of the end portions 11—12 of Figures 1 and 2, or simply as a straight length of connector for use where the adjacent ends of two conductors are connected electrically and mechanically in place of the single conductor illustrated.

The stock connector 17 as it comes from the factory is provided with a slot 18, as in Figures 2-5 form, except that in this case the bottom 19 of the slot is inclined to the longitudinal axis $c$—$d$ of the connector. It is noted in this case that the left or deep end of the slot 18 extends a material distance below the axis $c$—$d$. A conductor 20 which fits the slot 18 more or less snugly is located therein in engagement with the inclined bottom 19 of the slot for its entire distance as indicated in Figures 7 and 8.

The connector 17 with one or more conductors in place therein is subjected to one or more crimping operations as suggested for the preferred form to form two bands 21 and 22. This has the effect at and in the adjacently crimped areas of bending the sidewalls 23 and 24 outlining the slot 18 from their upstanding sharp edge positions shown in Figure 8 inwardly and downwardly curled portions shown respectively at 25—26 of Figure 10. Here again the portion of metal at the crotch 27 below the slot is not involved in the bending or swedging operation and thus maintains its initial factory fabricated form and physical characteristics.

Operating in this way the bottom of the resulting bore 28, in which the conductor 20 is, finally conforms to and takes the cross sectional configuration of the conductor 20 in the right portion 29, that is, the portion of least slot depth but is of greater depth than the conductor at the left end 30 or portion of greatest slot depth. This has the effect of providing a slight clearance 31 at the left end of the connector as shown in Figures 9 and 10. This clearance 31 permits a slight freedom of movement between the left portion of the conductor 20 and the connector and thus tends to minimize possibility of the conductor being sheared off as it emerges from the left end of the connector. It is understood that the portions of these conductors exteriorly of their connectors are subjected to vibration which is quite apt to break the conductors at their jointure with the connectors especially if the connection provides sharp edges. The clearance 31 permits lateral play to the conductor as it emerges from the connector sufficient to avoid the conductor bending back and forth across any such sharp cutting edges as would otherwise be provided by the conductor if the conductor emerged therefrom through a surface engaging the conductor. In this way, the conductor is held to the connector along a length thereof inwardly of the left end of the connector and the left end of the conductor has a limited degree of freedom at least vertically, as shown in Figure 9 before the extruded end of the conductor contacts the end face of the connector. This freedom, even though slight, is sufficient to defeat the possibility of the connector shearing off the conductor.

As the vertically transverse depth of the slot as viewed in Figure 5 is greater than the horizontal width of the slot and thus greater than the diameter of the conductor seated in the bottom of the slot, it follows that when the thin edges at opposite sides of the throat of the slot are pressed towards each other as shown in Figures 6 and 10, the bore of the resulting connector assumes a tear-drop form in cross section at the several points where the crimping is made. As the thin edges come in contact with each other as shown in Figures 6 and 10 they initially offer relatively slight resistance to mutual distortion and which resistance to distortion becomes more pronounced as more and more metal becomes involved.

Referring to the third form of the invention illustrated in Figure 11, the main line A ends in a terminal G of any conventional design. A conductor H of a tap I is connected to the conductor B of the main line A by means of a Z-shaped connector 32 instead of the elbow form of connector shown in Figures 1–6. The two parallel and longitudinally offset legs 33 and 34 of the blank from which the connector is formed are integrally connected by an S-shaped midportion 40, each has its outer side slotted from end to end as indicated respectively at 35 and 36, in the same manner as has been previously described for the formation of the slot 16 in Figure 5. As the two end portions are identical either end maybe applied to a mid-portion of the main conductor wire B and the tap wire maybe be inserted laterally into either end portion of the connector as described for the Figures 1–6 form of the disclosure. More specifically described, the slotted blank is applied to the main line conductor B by moving it laterally to receive the conductor in the bottom of slot 35 after which the initially upstanding sides of the slot are rolled inwardly as previously described in connection with Figures 5 and 6 to form the crimps or bands 13 in the finished connector 32. With the connector 32 thus firmly secured to the main line conductor B, the exposed end of the conductor H of the tap I is located in its other slot 36 and here again the side walls of the slot 36 are rolled or crimped inwardly towards each other as indicated at 13, into binding engagement with the conductor H as previously described in detail in connection with the other forms of the invention.

It is also suggested that the shank portion J of the terminal G be likewise formed as above described for either of the legs 11 or 12 and crimped on to the end of the conductor B by means of one or more crimped bands 13. In other words a cross section at any of the crimps 13 of Figure 11 would appear as shown in Figure 6.

I claim:

1. An electric connector formed of malleable metal and including a cylindrical part provided along one side with a deep, radially-extending slot, in all cross sections thereof having a semicircular bottom with its axis substantially coinciding with the axis of the cylindrical part and the opposing straight side walls thereof being tangential to the bottom, the metal in the part between the bottom and the cylindrical outer face forming an arched crotch of substantially uniform thickness, the free outer edges of said side walls meeting the curved adjacent outer face of the cylindrical part to form feathered edges, a conductor of cylindrical form snugly fitted to the semi-circular bottom, the feathered edges being inwardly curled and contacting lengthwise to form a closed joint at the point so curled and to give the portion of the slot wherein a tear-drop form with a clearance between the conductor and the joint, each side wall in the portion thereof between its feathered edge and its point of tangency with the conductor being bent inwardly towards the other for a limited longitudinal distance and thus the walls being crimped are stressed from their initial form in the area so crimped, leaving the arch-forming crotch at the bottom of the slot substantially undeformed and thus unstressed.

2. The device defined in claim 1 and in which the outer face of the cylindrical part including the arched crotch is provided with at least one crimping band.

3. The device defined in claim 1 and in which the slot is deeper at one end than at the other to form the bottom inclined to the axis of the cylindrical part.

4. An electric connector including an end portion of cylindrical outline provided along one side with a slot extending radially and progressively of increasing depth as it approaches one of its ends, a conductor in the slot snugly fitted to and engaging the bottom of the slot in its portion of least depth and having a limited degree of movement in the plane of the slot at the end having its maximum depth and at least one portion of the free ends of the walls forming the throat of the slot being curled inwardly towards each other for a limited length to form a crimped band to secure the portion of the conductor therein to the end portion of cylindrical form.

5. An article of manufacture forming a one-piece electric connector formed of malleable metal and including a cylindrical part provided along one side with a deep, radially extending wide-open slot forming on opposite sides thereof a pair of spaced-apart parallel side walls, said slot in all cross sections thereof having a semi-circular bottom with its axis parallel to the axis of the cylindrical part, the inner faces of the side walls defining opposite sides of the slot disposed in parallel spaced-apart planes tangent to the oposite sides of the bottom, the metal in the cylindrical part between the bottom and the cylindrical outer face forming an arched crotch of substantially uniform thickness, the free outer edges of each of the inner faces of the side walls meeting the curved adjacent outer face of the cylindrical part to form feathered edges.

6. The article defined in claim 5 wherein the connector is of elbow form and the slot extends wide open from end to end about the outer side of the elbow.

7. The article defined in claim 5 wherein the connector is of Z-shape with the slotted side of each end portion facing outwardly and thus in relatively opposite directions.

MARTIN D. BERGAN.

REFERENCES CITED

The following references are of record in the file of this patent:

UNITED STATES PATENTS

| Number | Name | Date |
|---|---|---|
| 474,584 | Tobey | May 10, 1892 |
| 1,404,377 | Currier | Jan. 24, 1922 |
| 1,855,645 | McIntosh | Apr. 2, 1932 |
| 2,106,007 | Klein | Jan. 18, 1938 |
| 2,210,520 | Barry | Aug. 6, 1940 |
| 2,236,967 | Conty | Apr. 1, 1941 |
| 2,296,443 | Kleinfelder | Sept. 22, 1942 |
| 2,307,216 | Graham | Jan. 5, 1943 |
| 2,327,651 | Klein | Aug. 24, 1943 |